United States Patent
Fuhrer et al.

(10) Patent No.: US 8,065,934 B2
(45) Date of Patent: Nov. 29, 2011

(54) HEAT EXCHANGER WITH INTEGRATED BYPASS VALVE

(75) Inventors: Gerhard Fuhrer, Friedrichshafen (DE); Gerhard Horing, Hagnau (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 248 days.

(21) Appl. No.: 12/306,875

(22) PCT Filed: Jun. 6, 2007

(86) PCT No.: PCT/EP2007/055577
§ 371 (c)(1),
(2), (4) Date: Dec. 29, 2008

(87) PCT Pub. No.: WO2008/000605
PCT Pub. Date: Jan. 3, 2008

(65) Prior Publication Data
US 2009/0320642 A1     Dec. 31, 2009

(30) Foreign Application Priority Data
Jun. 30, 2006   (DE) .................. 10 2006 030 790

(51) Int. Cl.
*F16H 57/04*   (2010.01)
(52) U.S. Cl. .................................... 74/606 A
(58) Field of Classification Search ............... 74/606 A; 165/41, 42, 185, 281, 283
See application file for complete search history.

(56) References Cited

U.S. PATENT DOCUMENTS

| | | | |
|---|---|---|---|
| 3,743,011 A | 7/1973 | Frost | |
| 4,844,202 A | 7/1989 | Maresko | |
| 5,165,468 A * | 11/1992 | Tajima et al. | 165/47 |
| 5,992,515 A * | 11/1999 | Spiegel | 165/283 |
| 6,227,333 B1 * | 5/2001 | Scheib et al. | 184/6.22 |
| 6,253,837 B1 * | 7/2001 | Seiler et al. | 165/103 |
| 6,401,670 B2 | 6/2002 | Frunzetti et al. | |
| 6,935,569 B2 * | 8/2005 | Brown et al. | 236/34.5 |
| 2005/0205236 A1 | 9/2005 | Kalbacher et al. | |
| 2006/0213462 A1 | 9/2006 | Horing et al. | |

FOREIGN PATENT DOCUMENTS

| | | |
|---|---|---|
| DE | 841 978 | 6/1951 |
| DE | 1 919 377 | 11/1970 |
| DE | 37 14 230 A1 | 11/1988 |
| DE | 39 23 936 A1 | 1/1991 |
| DE | 42 32 366 A1 | 3/1994 |
| DE | 100 19 029 A1 | 10/2001 |
| DE | 103 15 684 A1 | 10/2004 |
| DE | 10 2004 004 975 A1 | 8/2005 |

* cited by examiner

*Primary Examiner* — Vicky Johnson
(74) *Attorney, Agent, or Firm* — Davis & Bujold, P.L.L.C.

(57) ABSTRACT

A transmission (8) having a transmission housing (26) having a region in which gear wheels (66, 68) rotate and a heat exchanger (30) which absorbs the heat generated in the transmission (8). This heat is transferred to a transmission lubricant and released to a coolant to transport the heat away from the transmission (8). A recess (56) is provided, in the transmission housing (26) outside of the region in which the gearwheels (66, 68) rotate, through which transmission lubricant flows and in which the heat exchanger (30) is arranged. The heat exchanger (30) has a bypass valve (48) which enables the heat exchanger (30) to be bypassed starting at a predefined low or excess pressure.

18 Claims, 3 Drawing Sheets

HEAT EXCHANGER WITH INTEGRATED BYPASS VALVE

This application is a national stage completion of PCT/EP2007/055577 Jun. 6, 2007 which claims priority from German Application Serial No. DE 10 2006 030 790.9 filed Jun. 30, 2006.

FIELD OF THE INVENTION

The present invention relates to a heat exchanger and a transmission with a heat exchanger.

BACKGROUND OF THE INVENTION

In modern vehicle transmissions subject to high loads, the transmission lubricant has to be cooled to temperatures that are uncritical for the system. In particular, in surroundings with high ambient temperatures and for vehicles in which the transmission is encapsulated for noise reduction reasons, cooling devices are accordingly provided in the form of heat exchangers. Heat exchangers are normally used for additional cooling of the transmission lubricant, but may also be used for warming up the transmission lubricant.

The currently known heat exchangers are either oil/air or oil/water heat exchangers and are mounted as additional components at a suitable location in the vehicle. Oil/water heat exchangers may also be integrated in the engine cooling system of the vehicle.

DE 103 15 684 A1 discloses a transmission having a transmission housing, which comprises a region, in which the gear wheels rotate. The transmission also has a heat exchanger which absorbs the heat generated in the transmission and transferred to the transmission lubricant and releases it to a coolant for transporting the heat away from the transmission. In the transmission housing, outside of the region in which the gear wheels rotate, a recess is provided through which lubricant flows and in which the heat exchanger is arranged. One version of the embodiment shows that a bypass valve is provided at the intake side of the pump transporting the transmission lubricant which enables the heat exchanger to be bypassed when the temperatures of the transmission lubricant drop below a specified limit.

The disadvantages of the prior art are, among other things, that additional interfaces are necessary for the constructively separated bypass valve which have to be sealed against leaks. Moreover, a bypass which is constructively separated from the heat exchanger and the power train to be cooled or warmed up requires appropriate constructive efforts and consequently also additional manufacturing costs.

The object of the present invention is to design a cooling system that is more efficient and to eliminate the disadvantages of the prior art.

This object is attained by a generic transmission comprising a heat exchanger with an integrated bypass valve.

SUMMARY OF THE INVENTION

A transmission exhibits a transmission housing comprising a region in which gear wheels rotate. The transmission also has a heat exchanger which absorbs the heat generated in the transmission and transferred to the transmission lubricant and releases it to a coolant for transportation of the heat away from the transmission. A recess is provided in the transmission housing that is arranged outside of the region in which the gear wheels rotate through which the transmission lubricant flows and in which the heat exchanger is arranged.

Advantageously, the heat exchanger is a separate component that may be inserted in the recess in the transmission housing. The heat exchanger may be held in place with only one sealed flange which, by way of example, is supported by a circlip. The sealant and flange may also be configured as one piece with the heat exchanger.

For maintenance and assembly purposes, the heat exchanger in the recess is advantageously accessible from outside of the housing. The heat exchanger may, by way of example, be configured as a pipe bundle or as a plate heat exchanger.

In a variation of the embodiment, the coolant is connected to a cooling unit outside of the transmission for transporting the heat away from the transmission. The embodiment is especially advantageous when the coolant for transporting the heat away from the transmission is a coolant within the cooling system of an internal combustion engine that drives the transmission.

The coolant is preferably a water-based fluid and the transmission lubricant an oil-based fluid.

By advantageously configuring and arranging the ducts for the transmission lubricant, the transmission housing directly forms the housing for the heat exchanger. This results in the forced conduction of the entire transmission lubricant across the heat exchanger. This improves the efficiency of the heat exchanger, achieving a smaller and more compact design. By way of short ducts and a large flow cross-section, which may be constituted by a systematic integration in the transmission housing, a very small pressure drop is obtained. Only simple and economic adapter parts are required for oil conduction, sealing and attachment. Even with regard to the connection of the coolant, this guarantees a simple and reliable system without additional sealing elements.

Despite the high level of integration the retrofitting and dismantling are easily accomplished without having to disassemble the entire transmission. The simple design and small number of interfaces result in low manufacturing costs. At the same time, very good protection of the heat exchanger from damage or other mechanical effects is achieved.

According to the present invention, the heat exchanger has a bypass valve arranged at the heat exchanger, which enables the heat exchanger to be bypassed starting at a predefined low or excess pressure.

Low pressure originates when the flow resistance in the recess that is arranged in the heat exchanger through which the transmission lubricant flows is increased and the intake side of a pump transporting the transmission lubricant is connected to an outlet opening of the recess.

Excess pressure originates when the flow resistance in the recess increases and the oil pump transporting the transmission lubricant is positioned between an oil sump of the transmission and the inlet opening of the recess. A higher flow resistance may, for example, originate, when the temperature of the transmission lubricant is below a specified limit and/or the transmission oil contains impurities. If such low and/or excess pressure prevails, a connection to the corresponding bypass ducts is established via the bypass valve arranged at the heat exchanger. Advantageously, these bypass ducts are directly integrated in the transmission housing. The function of the heat exchanger and the bypass function are separated from one another by a sealing element. The sealing element may, by way of example, be configured as a plastic or metal duct.

The bypass valve arranged at the heat exchanger is automatically mounted together with the heat exchanger in the transmission housing, guaranteeing high system reliability. The bypass function may be accomplished with a very compact design by arranging the bypass valve at the heat exchanger and integrating the bypass ducts in the transmission housing. Compared to a constructively separated bypass function, corresponding interfaces may be reduced by means of the integrated bypass function, thus solving the problem of leaks. By skillfully arranging the bypass ducts in the transmission housing, the constructive effort for the bypass function is minimal and therefore cost-effective.

The bypass valve arranged at the heat exchanger may preferably be configured as a poppet valve which comprises a valve cover and a valve cover spring. It is likewise conceivable that the bypass valve is configured as a spherical or as a slide valve.

BRIEF DESCRIPTION OF THE DRAWING

The basic principle of the present invention which allows various embodiments is explained below in more detail by way of example with reference to a drawing. The drawing shows.

DETAILED DESCRIPTION OF THE INVENTION

Figure 1:
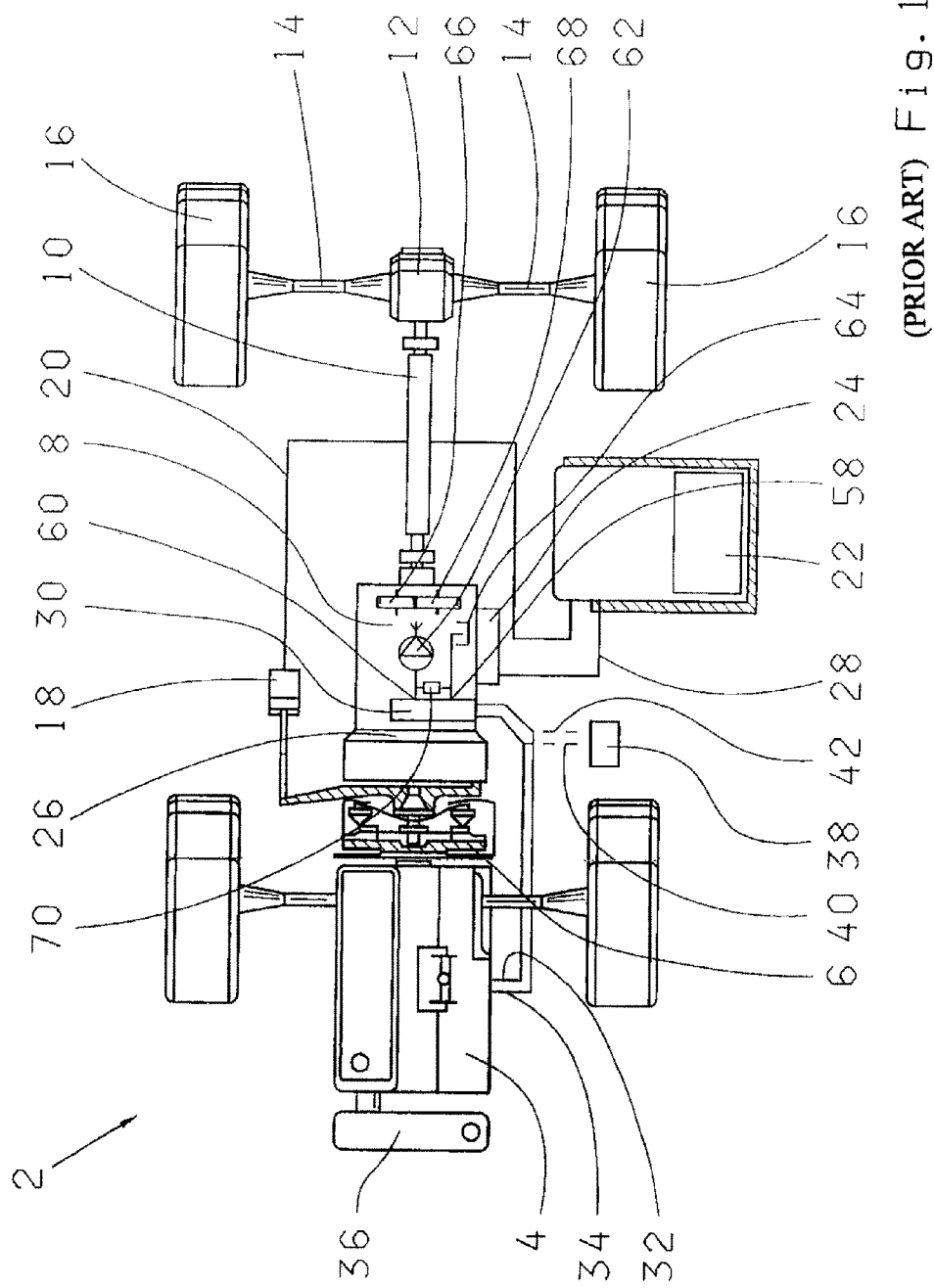
FIG. 1 is a schematic illustration of a vehicle with a prior art heat exchanger and bypass valve.

FIG. 1 shows a schematic illustration of a vehicle 2 having a drive motor 4, which acts upon a transmission 8 by means of a friction clutch 6. The transmission 8 is connected, via an output shaft 10, to a differential 12 which drives a vehicle wheel 16 via a half axle 14. The friction clutch 6 is actuated by an actuator 18, which is connected to a control unit 22 via a signal line 20. The transmission 8 is actuated by a transmission controller 24 which is arranged on the housing 26 of the transmission 8 and is connected to the control unit 22 via a line 28. A heat exchanger 30, which is connected to the motor 4 and the coolant via two coolant lines 32 and 34, is installed in the housing 26. The warmed-up coolant is cooled down in a vehicle cooling unit 36. A cooling unit 38 which is mounted on the vehicle 2 may alternatively be connected to the heat exchanger 30, via the coolant lines 40 and 42, in which the coolant of the heat exchanger 30 is then cooled down. The heat exchanger 30 is connected, via an oil inlet opening 58, to an oil sump 64 and, via an oil outlet opening 60, to an oil pump 62 which conveys oil to the gear wheels 66, 68 in a region of the transmission housing 26. At oil temperatures below a specified limit, the transmission lubricant does not flow through the heat exchanger 30, but is pumped through a constructively separated bypass valve 70, thus bypassing the heat exchanger 30.

Figure 2:
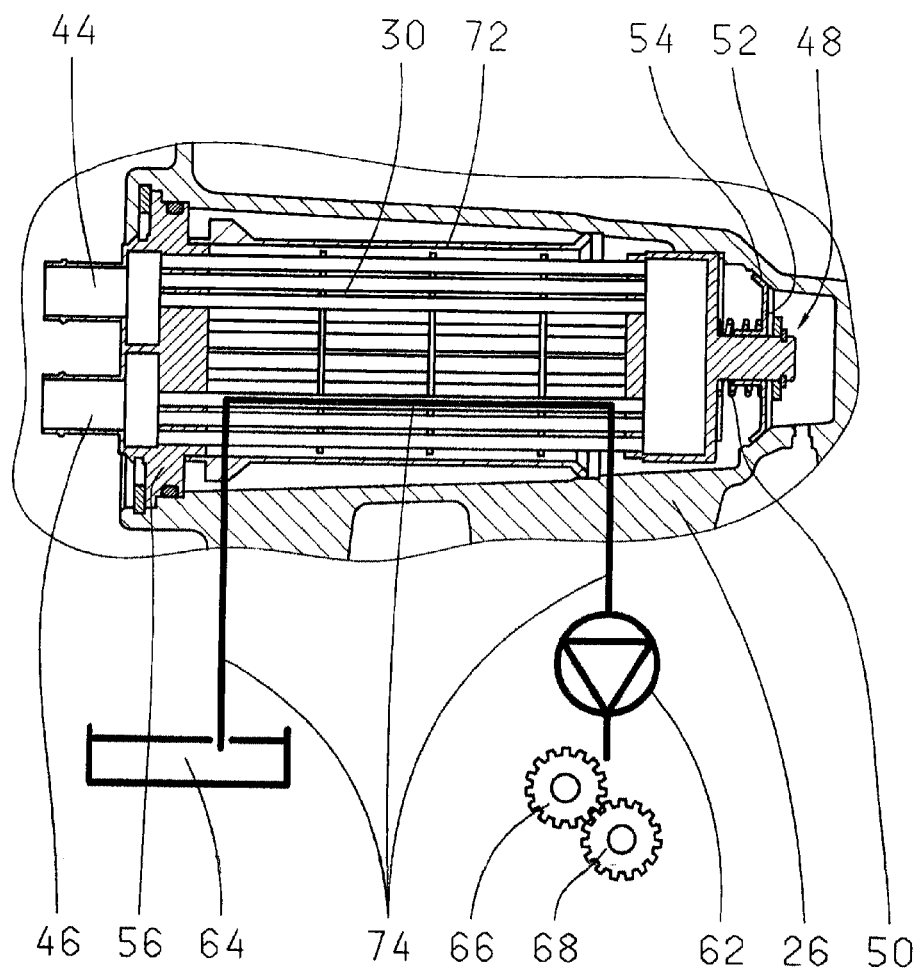
FIG. 2 is an embodiment of a heat exchanger with an integrated bypass valve during transmission lubricant cooling.

FIG. 2 shows the heat exchanger 30 according to the present invention with the integrated bypass valve 48 which is positioned in the transmission housing 26. The coolant reaches the inside of the heat exchanger 30, via an inlet opening 44, which again leaves the heat exchanger 30 via an outlet opening 46. In the transmission housing 26 the heat exchanger 30 is arranged in a recess 56 in such a way that the transmission lubricant drawn in by the oil pump 62 from the oil sump 64 enters the recess 56 via an inlet opening and there can flow around the heat exchanger 30. The force-fed transmission lubricant leaves the recess 56 again at an oil outlet opening and is drawn out in the direction of the oil pump 62 which conveys the oil to the gear wheels 66, 68 in a region of the transmission housing 26.

By arranging the heat exchanger 30 in the recess 56 of the transmission housing 26, through which the force-fed transmission lubricant is conveyed by the oil pump 62, optimal cooling of the entire transmission lubricant is achieved.

The heat exchanger 30 has a bypass valve 48 that is arranged at the heat exchanger which enables the heat exchanger 30 to be bypassed starting at a predefined low pressure. The bypass valve 48 is configured as a poppet valve and comprises a valve cover 52 and a valve cover spring 50. The transmission housing 26 has a valve seat 54 on which the valve cover 52 of the bypass valve 48 abuts in the inactive state. If the bypass valve 48 is inactive, the transmission lubricant which is drawn in by the oil pump 62 from the transmission oil sump 64 flows around the heat exchanger 30. Hydraulic lines 74 convey the transmission lubricant from the oil sump 64 into the recess 56 in which the heat exchanger 30 is arranged and from there to the oil pump 62 and/or to the gear wheels 66, 68. The function of the heat exchanger 30 and the bypass function are separated from one another by a sealing element 72.

Figure 3:
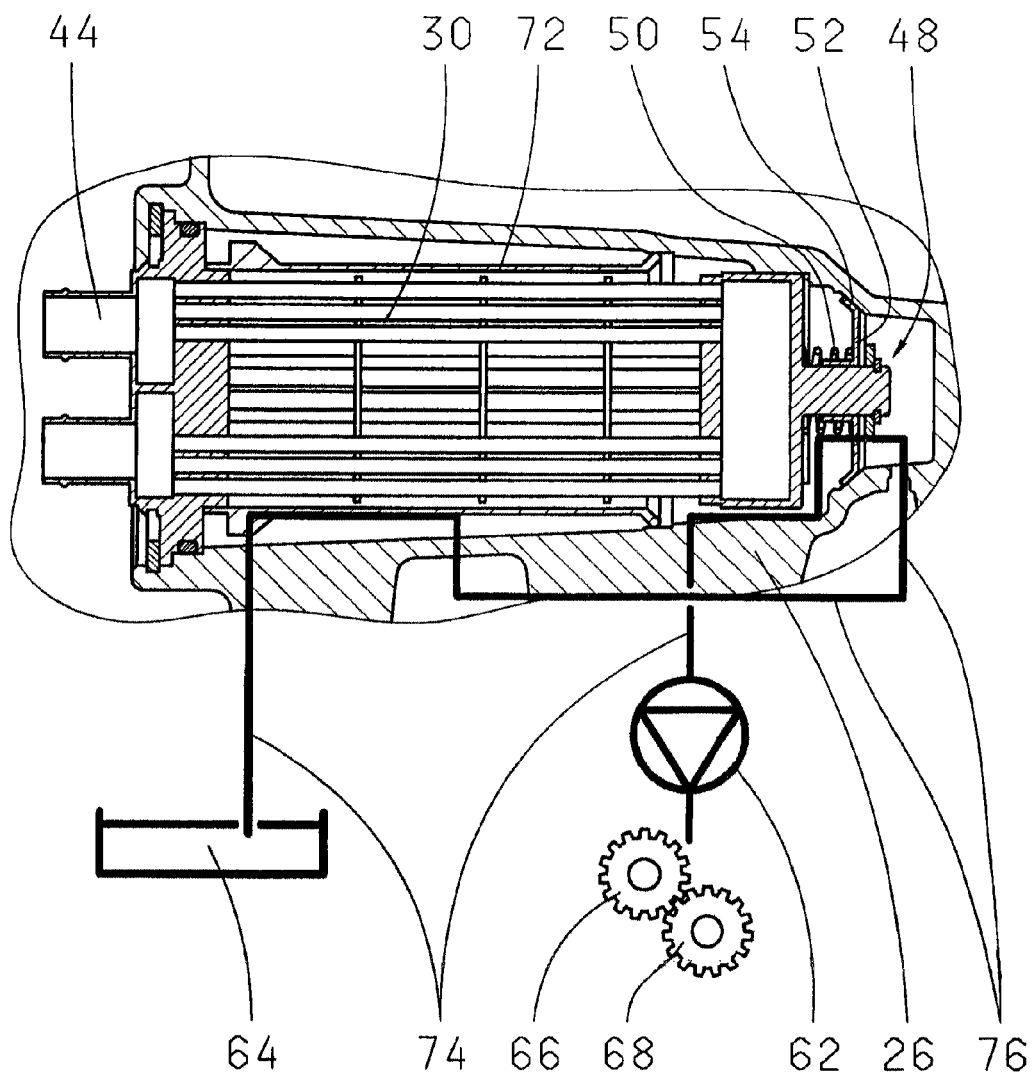
FIG. 3 is the heat exchanger according to FIG. 2 during a bypass function.

FIG. 3 shows the heat exchanger 30 according to FIG. 2 during a bypass function. The bypass valve 48 is illustrated in a still inactive state. The valve cover spring 50 is configured in such a way that, starting at a predefined low pressure in the recess 56 in which the heat exchanger 30 is arranged, a connection to the corresponding bypass ducts 76 is established via the valve cover 52 of the bypass valve 48. Advantageously, these bypass ducts 76 are directly integrated in the transmission housing 26. The function of the heat exchanger 30 and the bypass function are separated from one another by the sealing element 72. In the active state of the bypass valve 48, i.e. when a predefined low pressure in the recess 56 prevails, the valve cover 52 no longer abuts on the valve seat 54. Thus, the transmission lubricant drawn in by the oil pump 62 from the transmission oil sump 64 no longer flows around the heat exchanger 30 that is arranged in the recess 56. Hydraulic lines 74 convey the transmission lubricant from the oil sump 64, via the bypass valve 48, through the area limited by the sealing element 72 and the bypass ducts 76 to the oil pump 62 and/or to the gear wheels 66, 68.

The invention claimed is:

1. A transmission (8) comprising a transmission housing (26) which has a recess (56) and a region that is remote from the recess (56) in which gear wheels (66, 68) rotate and a heat exchanger (30) that is supported within a sealing element (72), a coolant flows through coolant lines in the heat exchanger (30) and absorbs heat generated in the transmission (8) and conducted to the heat exchanger (30) via a transmission lubricant which releases the heat to the coolant conducts the heat away from the transmission (8), a bypass valve (48) is supported by the heat exchanger (30) and directs the transmission lubricant to bypass the heat exchanger (30) when the transmission lubricant is at a predefined low pressure and an excess pressure, the bypass valve (48) comprises a poppet valve having a valve cover (52) and a valve cover spring (50) and the transmission housing (26) comprises a valve seat (54) that is located within the recess (56), the heat exchanger (30) is inserted within the recess (56) such that the valve cover (52) contacts the valve seat (54), and the sealing element (72) contacts the transmission housing (26), the sealing element (72) and the transmission housing (26) define a bypass duct therebetween which directs the transmission lubricant to bypass the heat exchanger (30).

2. The transmission (8) according to claim 1, wherein the transmission housing (26) comprises the recess (56) through which the transmission lubricant flows, the heat exchanger (30) is supported within the recess (56) within the transmission housing (26) outside of the region in which the gear wheels (66, 68) rotate, the sealing element (72) isolates the bypass duct from the heat exchanger.

3. The transmission (8) according to claim 2, wherein the heat exchanger (30) in the recess (56) is accessible from outside of the transmission housing (26) for maintenance and assembly purposes.

4. The transmission (8) according to claim 1, wherein the valve cover (52) of the bypass valve (48) abuts on the valve seat (54) when the bypass valve (48) is in an inactive state.

5. The transmission (8) according to claim 1, wherein the sealing element (72) isolates the bypass duct from the heat exchanger such that a function of the heat exchanger (30) and a bypass function are separated from one another by the sealing element (72).

6. The transmission (8) according to claim 5, wherein the sealing element (72) is one of plastic or metal duct, the heat exchanger (30) and the sealing element (72) are supported by a sealed flange which is fixed to the transmission housing (26).

7. The transmission (8) according to claim 1, wherein the bypass ducts (76) required for a bypass function are directly integrated in the transmission housing (26).

8. The transmission (8) according to claim 7, wherein the valve cover spring (50) is designed such that the valve cover (52) is separated from the valve seat (54) when the transmission lubricant is between the predefined low pressure and the excess pressure, thus releasing a connection to the bypass ducts (76) such that the transmission lubricant is conducted through the heat exchanger.

9. The transmission (8) according to claim 1, wherein the heat exchanger (30) forms a separate component with the valve cover (52) and the valve cover spring (50), the heat exchanger (30) being supported within the recess (56) in the transmission housing (26) by only a single sealed flange.

10. The transmission (8) according to claim 1, wherein the heat exchanger (30) is a pipe bundle heat exchanger.

11. The transmission (8) according to claim 1, wherein the coolant for transporting the heat away from the transmission (8) flows to a cooling unit (38) that is located remote from the transmission (8).

12. The transmission (8) according to claim 1, wherein the coolant for transporting the heat away from the transmission (8) is a coolant within a cooling system of an internal combustion engine (4) that drives the transmission (8).

13. A heat exchanger (30) that absorbs heat and releases the heat to a coolant to transport the heat away, wherein a valve cover (52) and a valve cover spring (50) are supported by the heat exchanger (30), a housing (26) has a recess and a valve seat (54) which is located within the recess, one end of the heat exchanger (30) being supported by a single sealed flange within the recess such that the valve cover abuts the valve seat of the housing to form a bypass valve (48) configured as a poppet valve, the heat exchanger (30) comprising a sealing element (72) which contacts the housing (26) and defines a bypass duct within the recess (56) between the housing (26) and the sealing element (72).

14. The heat exchanger (30) according to claim 13, wherein the valve cover spring (50) is designed in such a way that the valve cover (52) opens when a pressure within the heat exchanger is either below a predefined low pressure and above a predefined excess pressure, thus releasing a connection to bypass ducts (76).

15. The heat exchanger (30) according to claim 13, wherein the heat exchanger (30) is a pipe bundle heat exchanger.

16. The heat exchanger (30) according to claim 13, wherein the heat exchanger (30) is a component which is inserted within the recess (56) in a transmission housing (26) for transporting away the heat generated in a transmission (8) and released to a transmission lubricant.

17. The heat exchanger (30) according to claim 13, wherein the bypass valve (48) redirects the flow of the transmission oil from an oil sump (64) to bypass the heat exchanger (30) when the pressure level of the transmission oil is below a predefined low pressure.

18. A transmission (8) comprising:
a transmission housing (26) having a wall with a recess (56) and a valve seat (54) located within the recess (56), an oil sump (64) and a region in which gear wheels (66, 68) rotate;
a heat exchanger (30) having a coolant inlet (44), through which a coolant flows into an interior of the heat exchanger (30), and a coolant outlet (46), through which the coolant exits the interior of the heat exchanger (30), the heat exchanger (30) is removably secured within the recess (56) within the wall of the transmission housing (26), the oil sump (64) communicates with the recess (56), which communicates with an oil pump (62) such that transmission oil flows from the oil sump (64) to the recess (56) and communicates with the heat exchanger (30) enabling heat from the transmission oil to pass to the coolant before the transmission oil is pumped to the region of the transmission housing (26) in which the gear wheels (66, 68) rotate; and
a bypass valve (48) is fixed on an end of the heat exchanger (30) remote from the coolant inlet (44) and the coolant outlet (46) and is located within the recess (56) within the wall of the transmission housing (26) when the heat exchanger (30) is secured within the recess (56) such that a valve cover spring (50) biases a valve cover (52) of the bypass valve (48) to contact the valve seat (54),
the bypass valve (48) redirects the flow of the transmission oil from the oil sump (64) to bypass the heat exchanger (30) before the transmission oil flows to the region transmission housing (26) in which the gear wheels (66, 68) rotate when a pressure level of the transmission oil is outside of an optimal pressure range which is defined as being above a predefined low pressure and below a predefined high pressure, and
the heat exchanger is coupled to a sealing element with the heat exchanger being located within the sealing element, the sealing element contacts the wall of the transmission housing and divides the recess such that the heat exchanger and the bypass valve are located within the sealing element and a bypass duct is defined between the sealing element and the transmission housing and located exterior to the heat exchanger, the bypass duct being further defined by a sealing flange which supports the heat exchanger and bypass valve within the recess.

* * * * *